J. F. O'CONNOR.
SIDE BEARING FOR RAILWAY CARS.
APPLICATION FILED JAN. 20, 1913.
1,070,060.
Patented Aug. 12, 1913.
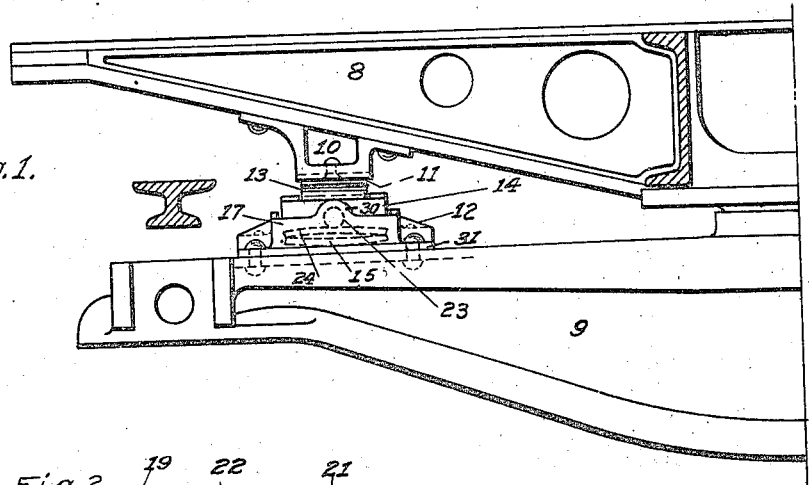
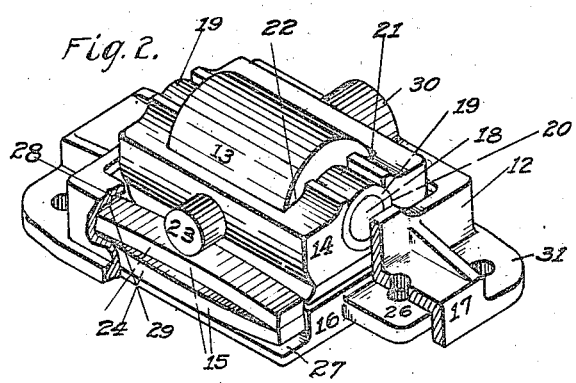
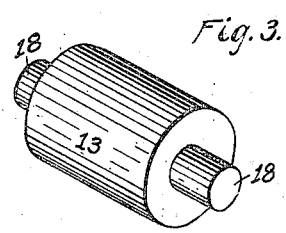
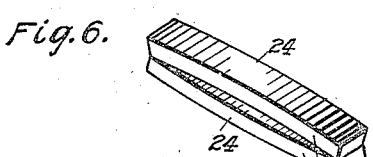
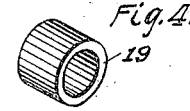
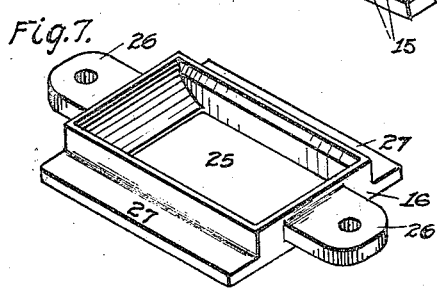
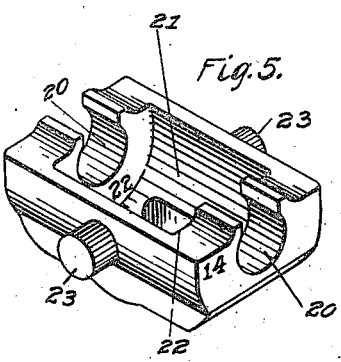
WITNESSES
INVENTOR
John F. O'Connor
BY
ATTORNEY

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

SIDE BEARING FOR RAILWAY-CARS.

1,070,060.   Specification of Letters Patent.   Patented Aug. 12, 1913.

Application filed January 20, 1913. Serial No. 743,070.

*To all whom it may concern:*

Be it known that I, JOHN F. O'CONNOR, a citizen of the United States, residing at Chicago, in the county of Cook and State of Illinois, have invented a certain new and useful Improvement in Side Bearings for Railway-Cars, of which the following is a full, clear, concise, and exact description, reference being had to the accompanying drawings, forming a part of this specification.

My invention relates to improvements in side bearings for railway cars.

The object of my invention is to provide side bearings having resilient members of a comparatively high shock absorbing capacity, and capable of efficient automatic adjustment to each other of the bearing parts.

In the accompanying drawings Figure 1 is an elevation of side bearings shown in place between the upper and lower bolsters of a railroad car. Fig. 2 is a perspective view, (partly broken away), of the lower bearing. Fig. 3 is a perspective view of the roller. Fig. 4 is a perspective view of one of the said roller's bearings. Fig. 5 is a perspective view of the cradle. Fig. 6 is a perspective view of one pair of cradle springs. Fig. 7 is a perspective view of the cradle frame.

In the drawings 8 represents the body bolster of a car, 9 the truck bolster, 10 the upper side bearing base casting secured to the body bolster, and having the bearing face 11. The lower side bearing 12 comprises an anti-friction roller 13, and adjustable cradle 14, springs 15 therefor, a cradle frame 16, and an inclosing base casting 17. The anti-friction roller 13 may be of any suitable form, a cylinder preferred, and provided at either end with trunnions 18, 18, which engage in the bearings 19, 19, which are secured in the openings 20, 20, in either end of the cradle 14. The cradle 14 is provided on its upper side with a recess 21, preferably conforming in contour to the adjacent anti-friction roller, having at either end a shoulder 22 which secures the roller against endwise movement. At either side and substantially midway between its ends the cradle is provided with a side trunnion 23. Each side trunnion rests upon a spring 15. Each spring is flat, and is preferably formed of two slightly curved oppositely faced members 24, 24.

The cradle frame 16 is preferably of a general rectangular shape, and is provided with an opening 25 within which the cradle 14 rests, the opening being of a size and shape adapted to permit oscillations of the cradle therein so that the anti-friction roller 13 journaled in the cradle may on movement of the car bolsters adjust itself to engage with its entire length the bearing face 11 of the upper side bearing.

Lugs 26, 26 provided at either end of the cradle frame are adapted to receive through them means to secure the frame to the base casting 17. The cradle frame is provided at either side with a flange 27. Each of said flanges substantially parallels in length the anti-friction roller 13 when the same is in its normal position, and each forms a seat for one of the spring members 15.

The inclosing base casting 17 surrounds the cradle 14 and its frame 16, and on either side forms with the flange 27 and the shoulder 28 of the cradle frame a recess 29, housing a spring 15. At either side this recess has an upwardly enlarged portion 30 to permit the movement of the trunnion 23 of the cradle 14 therein, and to secure the cradle against accidental displacement. The inclosing base casting 17 is provided with a flange 31 at either end adapted to pass over the flange 26 of the cradle frame, and perforated to receive rivets or other suitable means of securing it to the bolster 9.

By reason of the resilient mounting of the cradle within the cradle frame there is provided a side bearing having a comparatively high shock absorbing capacity. By reason of the location of the springs in relation to the cradle this device is specially powerful in its tendency to right the car trucks in their relation to the car body. By reason of the resilient mounting of the cradle in the manner described the anti-friction roller will on oscillations of the car body adjust itself automatically and quickly to the opposed bearing face of the upper base casting.

I claim:—

1. In a side bearing for railway cars, a base casting, an opposed member thereto comprising a cradle, an anti-friction roller journaled therein, a cradle frame, springs seated in said frame, the said cradle being provided with trunnions engaging the springs, and having an axis transverse to the axis of said roller.

2. In a side bearing for railway cars, a base casting, an opposed member thereto comprising a cradle, an anti-friction roller journaled therein, a cradle frame, an inclosing casting, said inclosing casting forming with the cradle frame a recess, springs within said recess, and means connecting the cradle with the springs.

3. In a side bearing for railway cars, a base casting having a bearing face, an opposed member having an anti-friction roller, a cradle for said roller, a supporting member for said cradle having a recess at either side of the cradle, and parallel to the axis of the roller, flat springs within each recess, the said cradle being provided with trunnions engaging the springs.

4. In a side bearing for railway cars, a base casting having a bearing face, a member opposed thereto comprising an anti-friction roller, a cradle therefor, a frame for said cradle having a flange and a shoulder on either side thereof, an inclosing casting adapted to form with the shoulder and flange on either side of the said frame a recess, springs within each recess, and trunnions projecting from said cradle and resting on said springs.

5. In a side bearing for railway cars, a base casting having a bearing face, a member opposed thereto comprising an anti-friction roller, a cradle therefor, a frame for said cradle having a flange and a shoulder on either side thereof, an inclosing casting adapted to form with the shoulder and flange on either side of the said frame a recess, springs within each recess, and trunnions projecting from said cradle and resting on said springs, said springs comprising each a pair of resilient plates.

JOHN F. O'CONNOR.

Witnesses:
ELEANOR L. NASH,
JOHN A. MARTINKUS.

Copies of this patent may be obtained for five cents each, by addressing the "Commissioner of Patents, Washington, D. C."